P. R. Berry, Elevating App.
104102 — Fig. 1. Patented Jun 14 1870
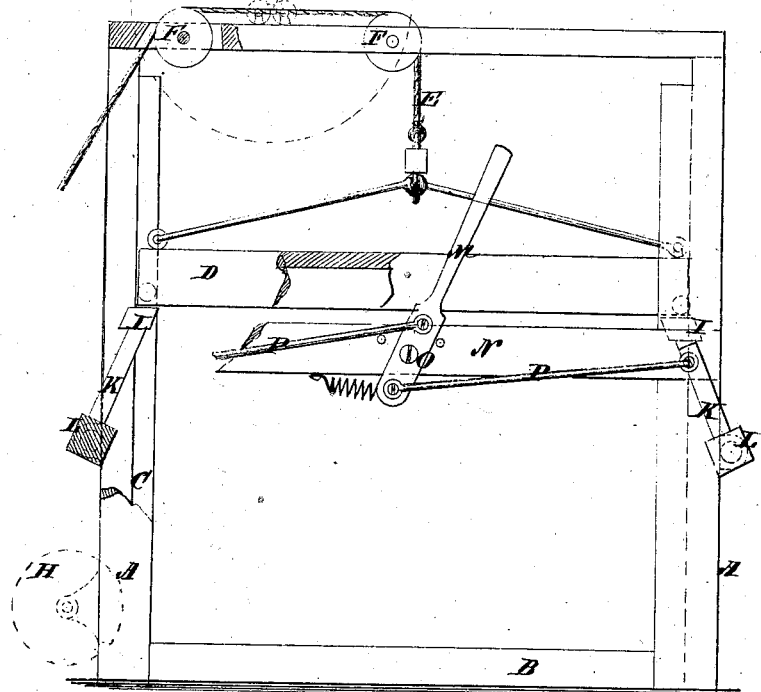
Fig. 2
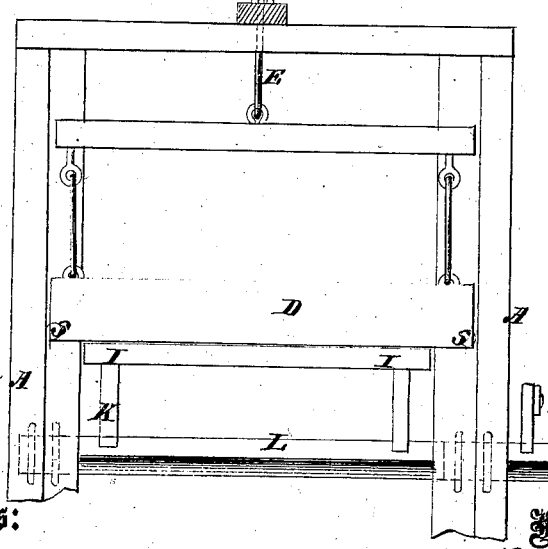
Witnesses:
John Becker
Alex. F. Roberts
Inventor:
P. R. Berry
per Mmm & Co
Attorneys.

United States Patent Office.

PLIMPTON ROSS BERRY, OF YOUNGSTOWN, OHIO.

Letters Patent No. 104,102, dated June 14, 1870.

IMPROVEMENT IN ELEVATING APPARATUS.

The Schedule referred to in these Letters Patent and making part of the same.

*To all whom it may concern:*

Be it known that I, PLIMPTON ROSS BERRY, of Youngstown, in the county of Mahoning and State of Ohio, have invented a new and improved Elevating Apparatus; and I do hereby declare that the following is a full, clear, and exact description thereof, which will enable others skilled in the art to make and use the same, reference being had to the accompanying drawing forming part of this specification.

This invention relates to improvements in apparatus for elevating brick, mortar, and other building material, in the erection of buildings, and consists in a platform, sectional vertical guides, and a safety-holding apparatus for holding the platform, arranged for hoisting the material either by manual labor or by horse or steam-power, in a rapid and economical manner, as hereinafter more fully specified.

Figure 1 is a side elevation of my improved apparatus, partly sectioned, and

Figure 2 is another side elevation, perpendicular to that of fig. 1.

Similar letters of reference indicate corresponding parts.

A represents vertical guides, to be made in sections about the length of the height of the stories of the buildings to be erected. They are supported on suitable sills, B, and have rebates, C, or other suitable guides, for the platform D, to be confined between them while moved up and down thereon.

The platform is connected to a hoisting-rope, E, passing up over the small pulleys, F, on the top cross-bar, or over a large one, G, and down under a guide-pulley, H, at the bottom, thence to the drum of the steam-engine, or other hoisting apparatus, as may be used.

To securely hold the platform when raised up to the place of delivery, I have provided the holding-bars I, mounted on the oscillating shaft L by arms K, and arranged to swing under the platform as soon as raised above them.

Each shaft is connected to a hand-lever, M, by rods, P. The lever M is pivoted to a cross-bar, N, by O, and one rod, P, is connected above the pivot, and other below, so that both bars I will be moved tow. the platform by one movement of the hand-lever, ¿ away by the other.

The said lever is provided with a spring, Q, wh is arranged to hold the bars I constantly in the p; of the platform, which strikes against them wl rising, and swings them out of the way. Immediat after passing, the spring will draw them back, so tl the platform may be let down and supported on th as soon as it has passed above them.

For releasing the platform to let it go down aga the attendant moves the lever in the direction to mc the arms I out from under the platform.

The platform may have friction-wheels or rollers, at the corners, to bear against the vertical guides to lessen the friction.

As each story is completed another section of guide A, is added, and the cross-bar, with the wheel F or is placed on the top. The holding apparatus is al placed on the upper section.

These platforms are used mainly to elevate tl building material placed on them in wheel-barrow which are rolled off the top and empty ones put on be reloaded.

Having thus described my invention,

I claim as new and desire to secure by Lette Patent—

1. The combination, with the vertical guides A, mac in sections as described, of the platform D, wheels F G, hoisting-rope E, and guide-wheel H, when tl wheels F or G are arranged on cross-bars or beam arranged for attachment to the top of any section the vertical guides, substantially as specified.

2. The combination, with the vertical guides au the platform, of the holding-bars I, oscillating su ports L K, lever M, connecting-rods P, and spring ( substantially as specified.

PLIMPTON ROSS BERRY.

Witnesses:
CHARLES L. STEWART,
LOVEREY A. RICHARD.